United States Patent Office 3,503,774
Patented Mar. 31, 1970

3,503,774
METHOD OF CLEANING OIL-CONTAMINATED PARTICULATE MATERIALS
Norman Frederick Weymouth, Basset, Southampton, England, assignor to The International Synthetic Rubber Company Limited, Southampton, England, a corporation of the United Kingdom
No Drawing. Filed Apr. 19, 1968, Ser. No. 722,571
Claims priority, application Great Britain, Apr. 25, 1967, 18,924/67
Int. Cl. B08b 17/04; B44d 1/02
U.S. Cl. 117—6
12 Claims

ABSTRACT OF THE DISCLOSURE

A process for the treatment of particulate masses, particularly sandy beaches, prior to contamination by fuel oil, in which a natural or synthetic rubber latex is sprayed on to the mass to form a coherent impregnation-retarding surface layer whereby, on contamination, the surface layer retards and at least partly absorbs the oil, the contaminated coherent layer together with any supernatant oil being subsequently removed.

---

The present invention relates to a method of treating a mass of particulate material in a situation where contamination with oil is imminent for example an area of beach or shore, in order to minimise the resultant pollution.

Beaches and other areas of the shore are open to pollution from oil which may be discharged or spilled into the sea and where such pollution occurs it can cause considerable damage to the beach and to wild life. Whilst it is obviously more convenient and desirable to disperse or collect the oil before it reaches the coast, this is not always possible, as when for example, weather conditions and the direction of winds and currents are adverse. When oil reaches the beach, rocks, pebbles shingle and sand are coated with the oil and penetration of the oil to a considerable depth (e.g. up to 18") can occur. Removal of the oil from such contaminated beaches is extremely difficult and tedious frequently involving not only the spraying of the area with large quantities of emulsifier and solvent, which is both expensive (and toxic to wild life), but also requiring the removal of the sprayed sands to low water mark. As the tide rises it washes and scours the sand so that emulsification of the oil takes place and the emulsified oil is carried away by the sea. Alternatively large amounts of straw can be spread on the beach and this collects the oil as contamination occurs. This is, however, expensive and wasteful and limited by the availability of straw.

An object of the present invention is to treat beaches and other areas of the shore before contact with the oil takes place so that, when pollution occurs, contamination is limited to the surface layer and removal of the oil is made considerably easier.

According to the invention there is provided a method for the treatment of a mass of particulate material to prevent contamination and impregnation thereof by oil, comprising forming, at the surface of the mass, a protective blanket or layer of coherent particles of natural or synthetic rubber whereby, upon exposure to oil, the oil is at least partly absorbed by the said layer and penetration of the oil into the mass is retarded and, subsequent to exposure to oil, removing the oil-contaminated rubber containing layer.

The rubber latex is applied to the particulate material before it has been contaminated with the oil so that the presence of the rubber serves, in effect, to minimise contamination of the particulate material in that the penetration of oil into the particulate material is reduced and in addition some absorption of the oil by the rubber takes place.

The present invention is particularly suitable for treating beaches.

In one embodiment of the invention a latex containing 5–65% by weight of rubber, although higher and lower contents are not excluded, preferably containing 5–40% of rubber, is applied to the sands at an application rate preferably of between about 1–12 ozs. of solid per square yard of sandy surface. Both higher and lower application rates may be used, but under normal circumstances an application rate within the range 2–6 ozs. solid per square yard is adequate. A tough layer of rubber and rubber-bonded sand particles is thereby produced in the surface layer of the sand which layer may, depending on the characteristics of the latex and the sand, extend into the sand to a depth of at least 1". When oil is washed onto the beach, penetration of the oil into the sand is retarded and some absorption of the oil into the rubber occurs. When the tide recedes this top layer of rubber-bonded sand particles, together with any absorbed oil, may be collected easily as a coherent mass and disposed of, the slight contamination arising from any penetration of the oil through the top layer being disposed of by conventional means.

The excess oil remaining on the surface of the top layer may be removed by any suitable means.

In principle, any non-oil-resisting rubber latex can be used in the process of the invention, examples of suitable latices including styrene-butadiene rubber latices of various monomer ratios, preferably having a major proportion of butadiene, butadiene-acrylonitrile latices, polychloroprene and polybutadiene latices, butadiene-isobutylene copolymer latices, butadiene-styrene-acrylate latices, similar latices obtained by substituting isoprene or another diene for butadiene, ethylene-propylene rubber latex, butyl and natural rubber. The preferred rubber latex is a low price general purpose commercially available styrene-butadiene rubber latex as such a latex can be prepared to practically any degree of coagulation stability depending upon the emulsifiers, electrolytes and buffers that it contains. Preferably, the molecular weight of the rubber should be between 20,000 and 400,000 and the styrene content should be between 0% and 50% and particularly satisfactory results have been obtained with an SBR latex containing approximately 23% bound styrene by weight.

The latex may be extended with a compatible oil in amounts dependent on the latex type. Generally, between 0.5 and 20 parts of oil per one part by weight of rubber can be incorporated in an emulsion without detriment. Particularly satisfactory proportions are 9 parts of oil to 1 part by weight of rubber. Incorporation of the oil has the advantage that it lowers the cost of the final material, it makes application of the final material by spraying very much easier and it imparts to the film a degree of flexibility which allows it to accommodate surface movements due to wave action. The preferred oils are mineral oils which may be aromatic paraffinic or naphthenic.

Suitably the latex may be applied by spraying from a knapsack sprayer or from a boom sprayer towed by a tractor.

The following examples illustrate the invention:

EXAMPLE 1

Samples of sand about 3" deep contained in trays were sprayed with a brine solution to simulate sea shore conditions. An SBR latex of 30% solids in which the rubber had a Mooney viscosity $ML_4^{100}$ of 130 and contained 24% bound styrene was applied to the sand at the application rates shown in the table. A control was untreated. Hollow open-ended cylinders 2.5" in diameter were placed on the sand and filled to a depth of 2" with heavy fuel oil of Redwood viscosity 44. The period of time for complete penetration of the oil into the sand was noted in each case. These are shown in the table.

| Latex application rate (ozs. of solid/sq. yd.): | Time for complete penetration,[1] hours |
|---|---|
| 0 | 1¾ |
| 2 | 6–24 |
| 4 | 12–72 |
| 6 | >12 |

[1] Four results per tray.

Thus it can be seen that when the sand was treated with latex penetration of the oil was considerably retarded; this delay would allow treatment of the oil by conventional oil disposal methods. Furthermore pollution may be limited to the top layer of sand (approximately ¼" depth.) if the subsequent treatment and/or removal of the contaminated sand takes place soon after pollution has occurred.

EXAMPLE 2

A styrene-butadiene rubber latex of 21% solids containing 23% bound styrene was mixed with an aromatic oil emulsion in the presence of emulsifiers in the weight of 9 parts of oil to 1 of rubber. This oil-extended rubber latex was diluted with water and was then applied by spraying to areas of wet sand at application rates of 4, 5, 6 and 8 ozs. of solid per sq. yard and at an approximate volume rate of a fifth of a gallon per sq. yard. Normal tidal action did not disturb the films.

A heavy fuel oil mixed with water was applied to the treated areas and also to an untreated control area. The oil was absorbed quickly into the untreated area and after a short time penetration began.

The oil remained on the surface of the treated area and even after several hours, it had only penetrated the sand to a depth of one inch.

Removal of the top layer (approximately 1–2") of treated sand was sufficient to decontaminate the treated area whereas on the untreated area digging to a depth several times greater was necessary.

What is claimed is:

1. A process for the treatment of a mass of particulate material to prevent contamination and impregnation thereof by oil comprising forming, at the surface of the mass, a protective layer of coherent particles of a material taken from the group comprising natural and synthetic rubber whereby, upon exposure to oil, the oil is at least partly absorbed by the said layer and penetration of the oil into the mass is retarded and, subsequent to exposure to oil, removing the oil-contaminated rubber containing layer.

2. A method as claimed in claim 1 wherein the protective layer is formed by spraying a rubber latex having a solids content in the range 5–65% by weight, at an application rate of from 2 ozs. to 12 ozs. of rubber per square yard of the mass.

3. A method as claimed in claim 2 wherein the rate of application lies in the range of 2 ozs. to 6 ozs. of rubber per square yard of the mass.

4. A process as claimed in claim 3 wherein the rubber is an ethylene-propylene copolymer rubber.

5. A process as claimed in claim 3 wherein the rubber is a butyl rubber.

6. A process for the treatment of a mass of particulate material to prevent contamination and impregnation thereof by oil, comprising forming, at the surface of the mass, a protective layer of a butadiene polymer rubber latex of 5–65% solids content in which the butadiene content of the rubber is at least 50% by weight, whereby upon exposure to oil, the oil is at least partly absorbed by the said layer and penetration of the oil into the mass is retarded and, subsequent to exposure to oil removing the oil-contaminated rubber containing layer.

7. A process as claimed in claim 6 in which isoprene is substituted for butadiene.

8. A process as claimed in claim 6 wherein the comonomer comprises at least one material taken from the group consisting of acrylonitrile, isobutylene, styrene, acrylic acid and its derivatives.

9. A process as claimed in claim 8 comprising a butadiene-styrene copolymer containing 23–25% by weight of bound styrene.

10. A process as claimed in claim 9 in which the rubber latex is extended with a mineral oil.

11. A process as claimed in claim 10 in which the ratio of extending oil to rubber lies in the range 0.5–20:1 by weight.

12. A process for treatment of a sandy foreshore to prevent contamination and impregnation thereof by fuel oil comprising spraying on to the surface of the sand so as to form a protective layer at the surface thereof, an oil extended butadiene-styrene copolymer rubber latex containing 23% bound styrene by weight, the ratio of oil to rubber being 9:1 by weight, the rate of application being 4–8 ozs. of rubber per square yard of sand, whereby, upon exposure to oil, the oil is at least partly absorbed by the said layer and penetration of the oil into the mass is retarded and, subsequent to exposure to oil, removing the oil-contaminated rubber containing layer as a coherent mass.

References Cited

UNITED STATES PATENTS

| 2,854,347 | 9/1958 | Booth et al. | 117—6 |
| 3,310,909 | 3/1967 | Bennett | 47—9 |
| 3,337,987 | 8/1967 | Bennett | 47—9 |

FOREIGN PATENTS

| 245,233 | 6/1963 | Australia. |

MORRIS O. WOLK, Primary Examiner

JOSEPH T. ZATARGA, Assistant Examiner

U.S. Cl. X.R.

47—9; 61—1, 36; 117—100; 134—4